UNITED STATES PATENT OFFICE.

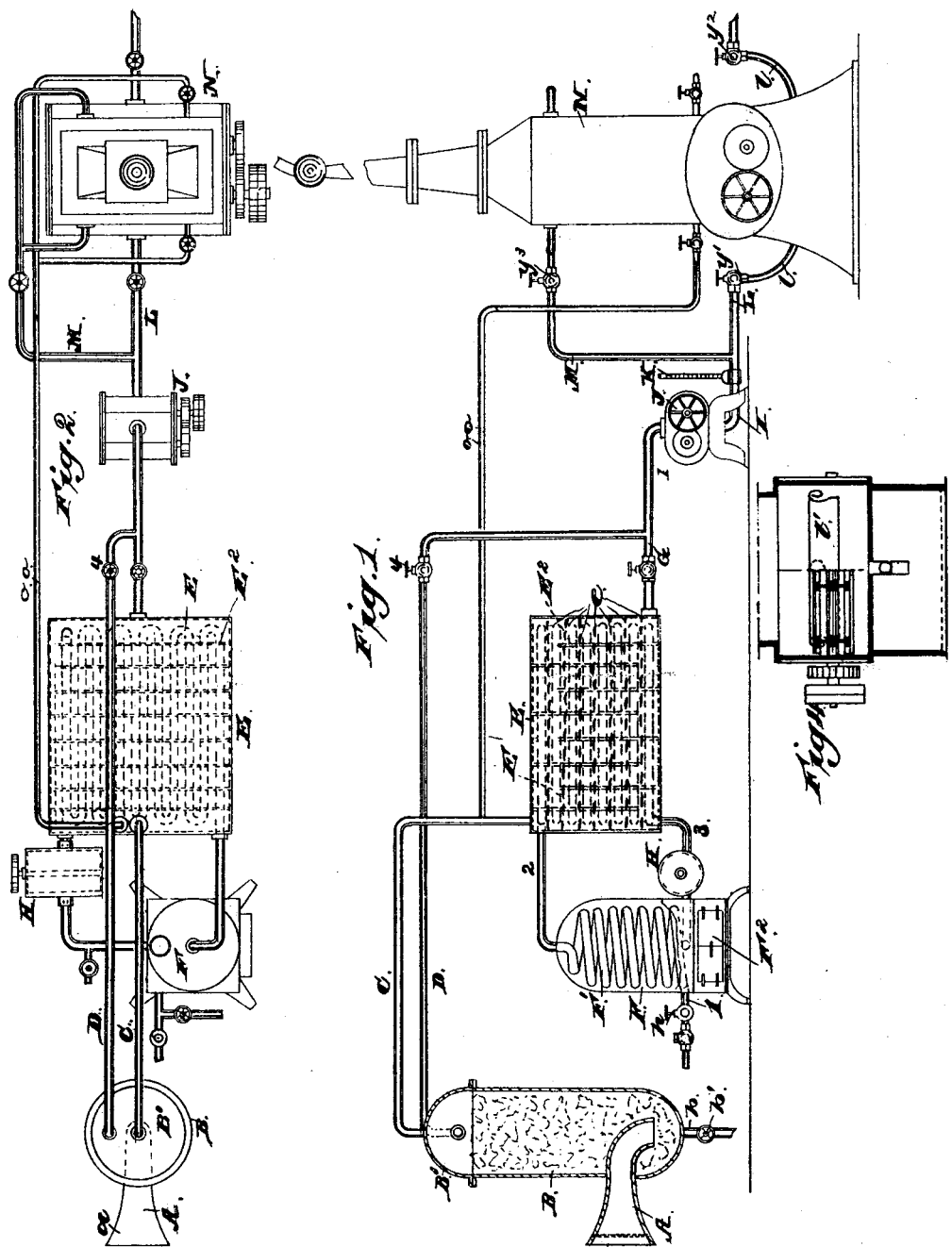

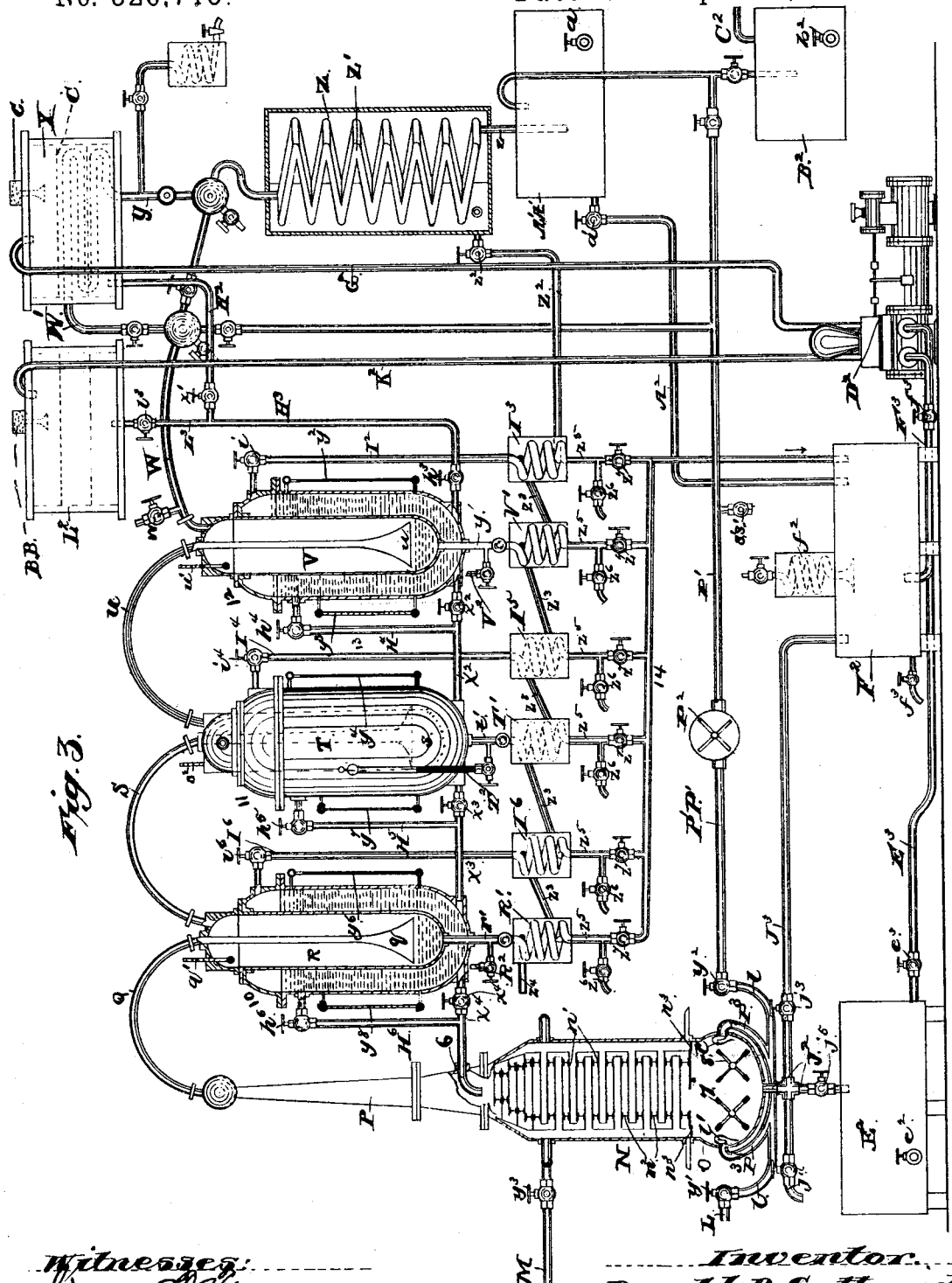

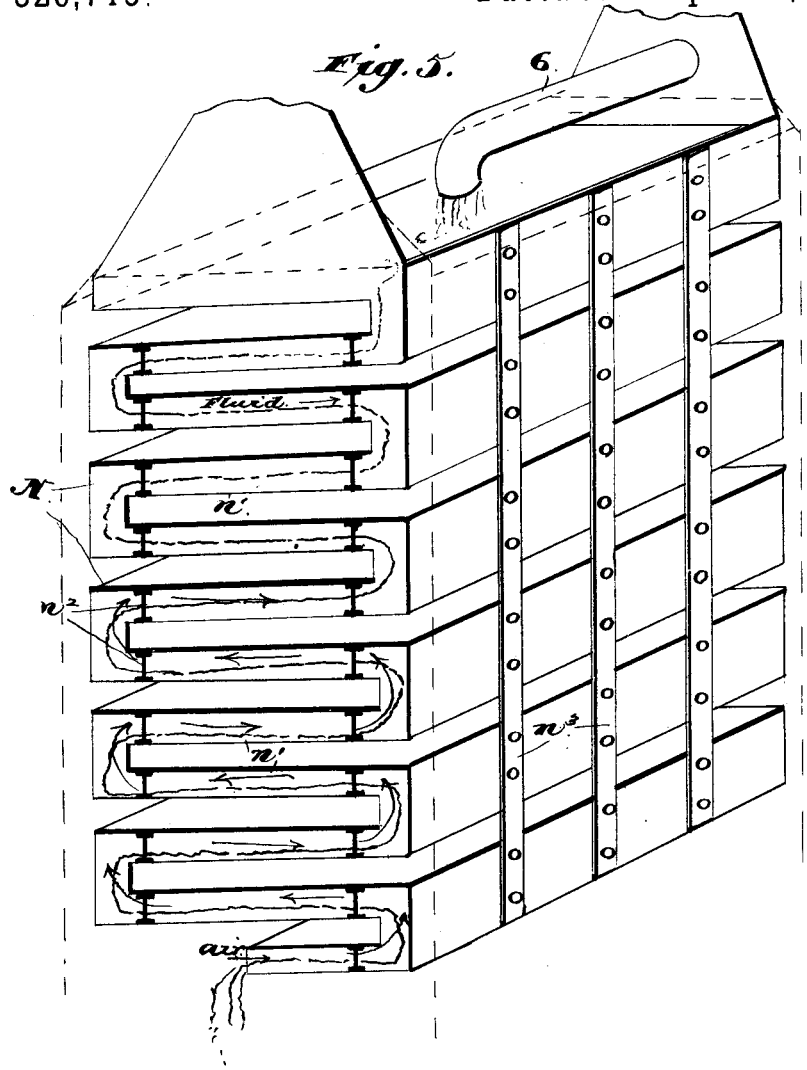

DONALD D. CATTANACH, OF PROVIDENCE, RHODE ISLAND.

PROCESS OF MANUFACTURING AND DISTILLING ALCOHOL AND HYDROCARBONS AND OF RECTIFYING AND AGING LIQUORS.

SPECIFICATION forming part of Letters Patent No. 326,715, dated September 22, 1885.

Application filed March 27, 1885. (No model.)

*To all whom it may concern:*

Be it known that I, DONALD D. CATTA-NACH, a citizen of Great Britain, residing at Providence, in the county of Providence and State of Rhode Island, have invented certain new and useful Improvements in Process of Manufacturing and Distilling Alcohol and Hydrocarbons and of Rectifying and Aging Liquors, of which the following is a specification, reference being had to the accompanying drawings.

My invention relates to a process of manufacturing and distilling alcohol and hydrocarbons and of rectifying and aging liquors;
and it consists in the steps hereinafter particularly described, and pointed out in the claims.

Heretofore alcohol and other spirits have been distilled by the action of heat, by steam, and by steam and air commingled, in apparatus constructed, arranged, and adapted especially for and to each of said methods or processes. Said processes and the apparatus therewith employed have been but partially successful in accomplishing desired results, for various reasons; are expensive, and do not and cannot produce such qualities of alcohols and other spirits as are required for many purposes.
The object of my invention is to provide a process by which alcohols and other spirits of any required degree of purity may be cheaply produced, and hydrocarbons purified, at any and all times, with an apparatus simple in construction, easy of management, readily understood, economical in use, and certain in its results.

The essential feature of my process is the use of pure dry heated air in closed vessels in contact with the vapor arising from the material or fluids to be distilled, which vapors are generated by the heat conveyed to said vessels by said heated air, and thereby imparted to said material or fluids.
In carrying out my process I first pass atmospheric air through a vessel filled with lumps of pumice-stone previously saturated with sulphuric acid, thence to a heating-box, where it is raised to the required temperature, and thence to and through the distilling apparatus proper. By so doing, it will be seen, I obtain an agent for heating the material or fluid to be distilled, and for separating the spirits therefrom, cleansed of all impurities and freed from all deleterious and noxious substances and odors, quick, penetrating, and efficient in its action.

Where heat is applied directly to the distilling apparatus or through the medium of steam or steam and air commingled, the deleterious substances and noxious odors resident in or arising from the materials or fluids treated to some extent are necessarily imparted to the spirits distilled therefrom. By the process herein described I have found that such substances and odors are entirely removed from the spirits distilled.

By employing heated air only in my process the apparatus used is greatly simplified, and the cost of distillation consequently materially reduced.

In carrying out my process I use the apparatus illustrated in the accompanying drawings, forming a part of this specification, wherein like letters of reference refer to similar parts, and in which—

Figure 1 is an elevation of the air-heating apparatus, together with the suction-fan. Fig. 2 is a plan view of the same. Fig. 3 is a sectional elevation of the distilling and rectifying apparatus, and Fig. 4 is a detail section of the lower portion of the rectifying-cylinder, taken on the line $xx$ of Fig. 3. Fig. 5 is a detail view of the fret-work shelves.

The air which may have been previously washed is sucked into a pipe, A, having a bell-mouth, $a$. In this bell-mouth is secured a gauze covering, which precludes the entrance of all larger bodies of foreign matter which might enter into said pipe A. This pipe is connected with and extends into the central lower portion of a cylinder, B, having a dome, B'. This cylinder is filled with lumps of pumice-stone, which are saturated with sulphuric acid, so that the air in passing through the mass of pumice-stone becomes dried and purified. In the bottom of this cylinder B is secured a pipe, $b$, having a valve, $b'$, for the purpose of drawing off any of the sulphuric acid which by gravity may have collected in the bottom of said cylinder.

From the top of dome B' a pipe, C, extends to a heating-chamber, E, thus taking the purified air and passing it directly into contact with a heating-surface. This heating-chamber E is provided with a coil of pipe, E', which is supported by and passes through holes or apertures cut in a series of vertical plates, E², arranged alternately, so that the air will pass down under the edge of one and up over the edge of the other, and so continue to circulate over these plates until the whole series will have been traversed. Lying between and resting on the section of this coil of pipes E' is a series of copper-wire nets, e, through which the air passes, thereby acquiring a greater amount of heat in a given time. Situated at a suitable distance from the said heating-chamber is a furnace, F, for the purpose of heating the air which is drawn into the coil in said furnace by means of the suction-fan H through the pipe 1. The air is heated at this point in the coil F', as said coil is situated over a furnace, F², of suitable construction, and then is carried by pipe 2 from the top of furnace F to the coil of pipe E' in the heating-chamber E. The heated air circulates through the coil E, returning back and forth through the fan H by pipe 3 and the coil F' of furnace F. Said fan H continues to draw a fresh supply from the atmosphere until a current is established, so that the said current of air under pressure will at all times circulate rapidly through the coils in the furnace F and the heating-chamber E. To ascertain when a sufficient current under pressure has been established in these coils, the valve $h$ is opened, and when it is found that a sufficient pressure has been established it is immediately closed, and also the valve through which the external air is sucked. The purified air entering the chamber E, through pipe C, is circulated through the said heating-chamber, and allowed to become heated sufficiently, when the air is sucked or drawn through pipe G into the suction-fan J, through which it passes, and out through the short pipe I, until it meets a branch pipe, M, where it is divided, a portion of the current passing to the top of the rectifier N, and a portion through pipe L to the lower part of said rectifier. The portion passing through pipe M enters the rectifier near its top, and passes into a chamber formed by the outer jacket. The portion passing through pipe L enters the lower part of the rectifier by means of two pipes, $l\,l$, branching from pipe L, said branches connecting with pipes $P^3\,P^3$, which enter the bottom of the rectifier and enter two deflectors, $l'\,l'$, which are curved and have closed ends, as illustrated in Fig. 4, and after passing through these deflectors impinges downwardly against the bottom sides of the rectifier, and there meets the paddles of the fans 7 and 8, which are revolved at a high rate of speed by suitable means, thus producing a rapid circulation of the heated air, for purposes which will hereinafter be described. If the air leaving the chamber E, Fig. 1, is found to be of too high a temperature, through the medium of the thermometer K, situated on the pipe I, leading from the fan J, the valve 4 of pipe D, which leads from the top of the air-purifying cylinder B, is opened, and allows the cold purified air to be drawn in by fan J, and meet the heated current passing through pipe G, reducing its temperature to the required degree. The fan H is kept in continuous motion while the process of distillation is going on, so that the air may be continuously circulated in the coils in the furnace and heating-chamber, thereby restoring the amount of caloric that has been taken up by the cold air passing through the pipe C, and that portion which has not been absorbed by the mash in the rectifier N, the returning-pipe $o\,o$ taking the air back from the jacket of the rectifier to the heating-chamber. By having the furnace and the heating-chamber separated one from the other, any leakage that may occur in the coil of pipe in the furnace is prevented from entering the heating-chamber, and avoids the contamination of the purified air therein by any foreign vapors which might escape into the heating-furnace, which vapors are confined in the chamber and escape through the flue thereof. The pipes entering the rectifier have suitable valves, $v'$, $v^2$, and $v^3$, which may be used when necessary to regulate the flow from or toward the rectifier N. This rectifier may be constructed of any suitable material, with a metal lining suitably coated with a metal which will not be deleterious to the process of rectification. The bottom of the rectifier is provided with the two fans 7 and 8, which are revolved at a high rate of speed by power applied on the outside of the rectifier, these fans taking the air which comes in through the deflectors $l'\,l'$, throw it into a high state of circulation, the one fan revolving downward and the other in the reverse direction. This rectifier is constructed with a series of fretwork shelves, which in this instance are constructed of thin sheets of tinned copper $n'$, being supported by small T-girders $n^2$, and the whole series being supported in the rectifier by suitable extensions, $n^3$, from the sides thereof, which are so arranged as not to interfere with the upward flow of the heated current of air or the downward flow of the material undergoing the process of distillation. Situated at a suitable distance is a receiving-vat, X, which is constructed of such material as is customarily used. This vat has a coil of pipe therein, which is traversed by a current of heated air under pressure, which enters the said coil by means of the pipes $P^3\,P^3$, which are connected to the branch pipes $l\,l$, which in turn are connected to the pipe L, heated air under pressure passing through said pipe. When the heated air enters the bottom of the rectifier, as above described, it passes up through the same into the pipe P and into the internal chambers, R, T, and V, out through pipe W, into pipe W', into the coil of pipe in the vat X, and from thence through the refrigerator Z, the supply to the vat-coil of this heated current being regulated by suitable valves. In the upper portion, near the top of this vat, is placed a wire-gauze sieve, C', on which the mash falls before entering the main body of the vat X. The object of this sieve is to free the mash from any fibrous substances or solids. This sieve can be taken out and cleaned, being arranged in vertical slides. On the top of the tank or vat X is placed a condenser, C, having a suitable cock, and having a bell-mouthed pipe extending into the upper part of the vat. This pipe allows the spirits which may arise from the mash to be condensed and fall back again into the mash. When the drawing of the mash from vat X begins, the cock in the condenser or trap on the top of said vat is opened to allow the air to flow in. To the bottom of the tank X a pipe, $H^2$, is connected, which has a valve, $x'$, said pipe connecting with another pipe, $H^3$, which runs into the bottom of a chamber, 12, this pipe also having a valve, $h^3$. As many chambers like chamber 12 may be used as are necessary to the more perfect distillation of the material operated upon; but in the drawings forming a part of this specification only three chambers are shown. The chamber 12 may be constructed of any suitable material, and has an internal chamber, V. The chamber 12 is cylindrical in form, and has a suitable gage, $v^2$, on one side and a thermometer, $v^3$, on the other, so that the height of the fluid and the temperature of the chamber may be readily ascertained during the process of distillation. This cylinder 12 is provided with a suitable cap or dome, to which the top of cylinder V is secured, the bottom of said cylinder V being held in position by a pipe, $v$, which connects with a condenser, V'. A pipe, W, connects with the top of the inside chamber, V, which leads to a refrigerating condenser, Z, said pipe W having suitable cocks and cut-off valves. To the top of chamber V a second pipe, U, is connected, which runs to the next chamber, 11, of the series of these chambers. To the uppermost part of the top of the outside cylinder, 12, a pipe, $I^2$, having a valve, $i$, is connected, which runs to a small condensing-chamber, $I^3$. To the opposite side of this chamber 12 a pipe, $H^4$, having a valve, $h^4$, is connected, but below the connection of pipe $I^2$. This pipe extends downward and connects with a pipe, $X^2$, having a valve, $x^2$, which runs from the lower part of the chamber 12 to the next chamber, 11, of the series, entering the bottom thereof. The chambers 11 and 10, next in order as represented above, have gages $v^4$ $v^6$, and thermometers $v^4$ and $v^6$, situated on opposite sides of the chambers. To the top portions of these chambers pipes $I^4$ and $I^6$, having valves $i^4$ and $i^6$, are connected, which run to small condensing-chambers $I^5$ and $I^7$. These chambers 11 and 10 are also provided with flow-pipes $H^5$ and $H^6$, having valves $h^5$ and $h^6$. These pipes connect with pipes $X^3$ and $X^4$, having valves $x^3$ and $x^4$ extending from the bottom of the said chambers, the pipes $H^5$ and $H^6$ connecting with the pipes $X^3$ and $X^4$ just ahead of the valves $x^3$ and $x^4$. The pipe $X^3$ connects the bottoms of the chamber 11 and 10 together, but pipe $X^4$, with nozzle 6, runs into the top portion, P, of the rectifier N, allowing the mash passing through these cylinders and their connecting-pipes to be released by this pipe $X^4$, and to come in contact with the top of the fret-work of shelves. The chambers 11 and 10 are also provided with distinct internal chambers, T and R, the chamber T being connected with chamber R by the pipe S, and the chamber R with the top or flue P of the rectifier N. The bottoms of these chambers T and R are connected with small condensing-chambers T' and R' by means of pipes $t'$ and $r'$. In these pipes $y'$, $t'$, and $r'$ are situated suitable gages, $V^2$, $T^2$, and $R^2$, which designate the height of the condensed spirit or aqueous fluid remaining in the bottoms of said chambers, so that the fluid which remains does not rise to a level with the bell-mouths $u$, $s$, and $q$ of the pipes U, S, and Q, which extend down to near the bottoms of these chambers. The top portions of these inside chambers are provided with small thermometers, $u'$, $s^2$, and $q'$, by which the temperature of the said internal chambers is ascertained.

As heretofore described, the chamber T is connected with the chamber V by pipe U, and this chamber V has also a pipe, W, with a suitable test-cock, $w$, connected therewith, which runs to a refrigerating condensing-chamber, Z, connecting with a condensing-flue, Z', situated therein. This flue Z' is constructed of a series of inclined plates joined at their edges, and is surrounded by any suitable cooling-mixture which will produce a rapid condensation of the heated spirits passing through the same. This refrigerator Z is connected with a receiving-tank, A', by a pipe, $z$, which in turn is connected with a tank, $B^2$, containing distilled water. This receiving-tank A and distilled-water tank $B^2$ have suitable drain cocks, $a$ and $b^2$, tank $B^2$ also being provided with an escape-pipe, $C^2$.

To the lower portion of the side of the refrigerator Z a pipe, $Z^2$, having a valve, $z^2$, connects, whereby the cooling-condensers $I^3$, V', $I^5$, T', $I^6$, and R' form a continuous series, being connected by the pipes $z^3$ $z^3$, as illustrated, the said pipes connecting the top of one chamber with the bottom of the other, and so on until the whole series are joined. In the last of these series of small condensers an outlet-pipe, $z^4$, may be placed to convey the surplus cooling-fluid to some suitable trap or receptacle. By this connection of the series as just described a continual flow of the cooling-mixture is kept up, surrounding the small coils situated in said condensers. To the bottom of each of these condensers a pipe, $z^5$, connects, running to the small coil in each condenser, said pipes containing cocks $z^6$ and valves $z^7$. The whole series of these pipes is connected to a pipe, 14, which eventually runs into a receiving-tank, $F^2$, said tank being supplied with a small condenser or trap, $f^2$, and a cock, $f^3$. Into the top of this tank also run pipes $A^2$ and $J^3$, having valves $a'$ and $j^3$, respectively. The pipe $A^2$ connects with the receiving-tank $A'$, and the pipe $J^3$ with the bottom of the rectifier N, the said pipe $J^3$ having a cock, $j^4$, situated at its extreme end. From the bottom of the rectifier N a pipe, $J^2$, having a valve, $j^5$, connects with the tank $E^2$, which has a suitable drain-cock, $e^2$. From the bottom of this tank $E^2$ a pipe, $E^3$, having a valve, $e^3$, runs to a pump, $D^2$, where it is connected to a pipe, $G^2$, which runs back and enters the top of vat X. From the bottom of the tank $F^2$ a pipe, $F^3$, having a valve, $f^3$, connects also with the pump $D^2$, where it connects with a pipe, $K^2$, which runs to the top of a second vat, $L^2$, which is also provided with sieves and a trap, B. This vat is connected with pipe $L^3$, having a valve, $l'$, which connects to the bottom portion of the chamber 12 by a pipe, $H^3$. The pipes $E^3$ and $F^3$, running to the pump $D^2$, connect with passages in the said pump by means which are well known in the art, the contents of one of the said pipes being pumped into its vat, to which its branch leads, at one operation, the valve in the one or the other of the pipes being closed when found desirable.

Oxygen or ozonized air may be used in connection with any of the rectifying or acidifying processes herein described, and when it is used a connection is made with the valve $s'$ in pipe $P'$ from a gas bag or reservoir under pressure. The oxygen enters pipe P, and is sucked in by the fan $P^2$, passing through said fan into the pipe P, which connects with both of the deflectors $l'$ $l'$ of the rectifier N. When the oxygen reaches this point, it may pass into the rectifier through the deflectors in a pure state, or it may be commingled with the pure heated air entering through the pipe L.

Having described the manner of generating the heated current of air under pressure and its course through the chambers, my improved process will be as follows: The current of pure heated air under pressure having been forced up through the rectifier, and through the inside chambers R T V by means of the connecting pipes thereof, will pass into the inner chambers and out through the valve W, all other sources of exit being previously cut off. By this means the chambers 10, 11, and 12 become of almost equal temperature, no cooling material having been brought in contact therewith. The mash, having been previously placed in the vat X by suitable means, runs down through pipe $H^2$, the valve $X'$ having been opened in said pipe, into pipe $H^3$, through the valve $h^3$, in through the bottom of the chamber 12, around the inner chamber V, and is allowed to continue to flow into chamber 12 until it reaches a level above the point where pipe $H^4$ enters said chamber, and then valve $h^3$ is closed. When this charge of the mash has become heated to a suitable degree, allowing what spirituous and aqueous vapors may rise to escape through the pipe $I^2$ into a condenser, the valve $x^2$ of pipe $X^2$ is opened and the mash is allowed to flow through the bottom of the second chamber until it reaches an equal level in both chambers, when the valve $x^2$ is closed and valve $h^3$ again opened, and the mash flowing in through said valve again raises the liquid to a level above the mouth of pipe $H^4$ when valve $h^3$ is again closed. When this second charge has been sufficiently heated, the valve $x^2$ is again opened, and a portion of the heated mash in chamber 12 again allowed to flow into chamber 11, said valve being closed when a sufficient amount of the mash has flowed into said chamber. Valve $h^3$ is now opened again, raising the mash already in chamber 12 to the level before stated. The chambers 12 and 11 will now both contain quantities of the mash undergoing the heating process. The valve $x^3$ is now opened, and a quantity of the heated mash in chamber 11 runs into chamber 10, when the valve $x^3$ is closed and valve $x^2$ is opened, allowing the chamber 11 to be again supplied with the mash from chamber 12, and when a quantity of the material has run from this chamber into chamber 11, the valve $x^2$ is closed and chamber 12 again charged with another supply of the mash by opening the valve $h^3$ after which said valve is closed. Valve $x^3$ is again opened, allowing part of the charge in chamber 11 to flow into chamber 10, when said valve is closed. This process continues, the mash gravitating from one chamber to the other, and so on throughout the series of chambers, until they are all filled above the level of the flow-pipes $H^4$, $H^5$, and $H^6$, which will be indicated by the gages on the sides of the chambers. The temperature of the mash in the last chamber, 10, may be of an even temperature with the heated current of air in and ascending up through the rectifier, but if at this stage of the process the mash in chamber 10 is found not to be of such temperature, it can be raised by suitably regulating the current of heated air. By this intermittent process of filling the chambers as described, I attain the temperature proper in each chamber before any material has been admitted into the rectifier and brought into contact with the hot air. During this process of gravitating the liquid from one chamber to the other the spirit from the mash, as it becomes warmer, will be generated and allowed to flow out of the top of the chambers into the pipes which lead to condensers, where it will be collected. When the temperature is found to be regulated to the proper degree, the valve $h^6$ is opened, as are also valves $h^3$, $h^4$, and $h^5$, allowing a regulated continuous flow of the mash from the vat X through the chambers, and out into the rectifier, the flow into the said chambers being equal to the outflow of the mash into the said rectifier. The material or mash contained in the last chamber flows out through pipe H⁶ into a branch pipe, 6, and thence onto the top surface of the series of fret-work shelves in the rectifier N. The spirit which may arise from the mash which is now continuously flowing through the chambers 12, 11, and 10, ascends and enters the pipes which lead to the supplementary condensing-chambers, where it is liquefied and remains, and is afterward collected. The mash flowing out of pipe 6, as stated above, comes in contact with the plates of the fret-work of shelves in the rectifier N, and with the current of heated air, and as said mash strikes the top of said shelves, more or less spirit will be distilled from the mash in consequence of the regulated degree of temperature of said shelves and air, and be carried up the flue P of the rectifier. The mash then flows through these shelves, as indicated by the arrows in Fig. 4, and the spirit which may arise from the same is taken up by and ascends with the high-pressure current of air which presses upon and passes through the descending mash. The mash continues to descend the shelves until it reaches the last of the series of the shelves, where it falls down into contact with the blades of the opposite revolving fans, and is dashed into spray and mingled thoroughly with the hot air. The spirit which may still be left in the mash is taken up by the ascending current of hot air into the flue P of the rectifier. The heavier or remaining portion of the mash falls into the bottom of the rectifier, from whence, if it is found to still contain any spirituous vapors, it is drawn off by pipe J² into a tank, E², from whence it can be run into a pump, D², by pipe E² and pumped up through pipe G² into the vat X, and again go through the distilling-chambers. Should the residuum be found to contain no more spirit through the medium of the test-pipe J³ and cock j³, it is drawn off at this point and allowed to run into a suitable waste-receptacle.

The spirits which have been collected by the heated current of purified air will be now distilled by fractional distillation, being taken up into the flue P of the rectifier N, passing up through said flue in a pipe, Q, connected with the top of said flue, and then flowing through said pipe down through the central portion of the inside of the heating-chamber R, said current being impinged against the bottom and sides of said chamber R by the flared mouth q of the pipe Q. On striking this bottom surface a portion of the aqueous and spirituous vapors is condensed. The current then passes upward out through pipe S, connected to the top of chamber R, allowing the current to flow through said pipe into chamber T, being there also impinged against its bottom by a flared or bell mouth of pipe S. This last chamber is of a lower degree of temperature, and more of the spirituous vapor will be condensed and remain in its bottom. The current continues to flow on through suitable pipes connecting a series of these heating-chambers until it will have reached the last of said series, being allowed to flow by the pipe U, as represented in the drawings, and enters this last chamber in the same manner as those above described, depositing the spirits which may be condensed. The temperature of these chambers may range from 165° to 195° Fahrenheit, the said temperature being ascertained by the small thermometers at the top of the inner chambers. When the current of heated air, which is still forced onward and depositing by condensation a portion of the spirits in each inner heating-chamber, reaches the last of the series of chambers, the portion which has not been thus far condensed ascends again to the top of the last chamber, and entering pipe W connected with said chamber passes in through the coil in vat X, into a refrigerating-condenser, Z. The air carrying the aqueous and spirituous vapors passing through the flue Z' of this condenser, the remaining spirit will be condensed and pass into a receiving-tank, A, the air passing out of this tank A down to a tank, B², of distilled water, where, if any spirituous vapors should still be carried along with the air, it is taken up or absorbed by the distilled water, the air escaping through a pipe in the top of the tank C². All of the mash to be distilled having been passed through the series of chambers around the inner heating-chamber, and the heated air having carried the vapors back, causing them to be condensed in the condensers described, said condensed spirits may be collected separately from the supplementary condensing chambers situated under and connected with the distilling-chambers by means of cocks attached to pipes running from the bottom of the several condensers; but to rectify the spirits it is all allowed to run into a pipe, 14, which connects with the tank F². The condensed spirit in receiving-tank A is also run into tank F² through pipe A' connecting these tanks. When all of the condensed spirits have been collected in this tank for the purpose of rectification, it is run into a pump, D², through a pipe, F³, and from this pump is drawn up through the pipe K² into the vat L², passing through a series of sieves into the bottom of the said vat. When all of the distilled spirits have been pumped into the vat L² by a pipe, K³, it is allowed to run into the distilling-chambers 12, 11, and 10, and onto the surface of the fret-work shelves in the rectifier, and the finer spirits taken back into the inner heating-chambers and condensed, and eventually into the refrigerating-condenser Z.

The process of rectifying is accomplished in the same manner as when the mash is first distilled, except that the distillate passes uninterruptedly through the chambers, whose valves have all been opened, the same being again collected and pumped into the vat L², the same operation being again pursued, and being separated as often as it is necessary to do so, until the spirits shall have attained a highly-rectified state and rendered free from all impurities and imperfections.

In the distillation or refining of hydrocarbons the crude oil is first placed in the vat X, and goes through the distilling-chambers in a manner similar to the distilling of alcohol above described. As the refined oil is condensed in the heating-chambers R T V, it is collected into the small condensers, and also that part of the refined vapor which ascends through the top of the outside cylinders, 10, 11, and 12, into the condensing-chambers or traps connected therewith. The condensed vapor in the supplementary condensers, as also that which has passed through the refrigerating-condenser into its receiving-tank, is run into the tank F², where it runs into the pump D² and is forced back to the vat X, whereby it may undergo the same process, this process being repeated until the crude oil has been highly refined and fractionally collected.

I am aware that purified hot air has been employed in aging and refining liquors, and hence I do not claim such use for that purpose, broadly.

I make no claim herein to the apparatus described, as that forms the subject of an application filed June 5, 1885.

Having thus described my invention, what I claim as new, and desire to secure by Letters Patent, is—

1. The herein-described process of distilling spirits, which consists in subjecting the material to be distilled to a current of hot air in a nearly-closed vessel in a finely-divided state, and then condensing the vapors generated, substantially as described.

2. The herein-described process of distilling alcoholic and other spirits, which consists in passing the material to be distilled through a series of closed chambers, into which a current of hot air is conveyed separate and apart from the material to be distilled, then subjecting said material, in a finely-divided state, to a current of hot air in a closed vessel, and finally condensing the vapors generated by passing the same through condensers, substantially as described.

3. The herein described process of distilling alcoholic and other spirits, which consists in passing the material to be distilled through a series of chambers heated to the desired degree by a current of hot air introduced into vessels inclosed in each of said chambers, and finally subjecting said material, in a finely-divided state, to a current of hot air in a nearly-closed vessel, and then condensing the vapor, substantially as described.

4. The herein-described process of rectifying and aging alcoholic and other spirits, which consists in passing the same through a series of chambers, into which a current of hot air is conveyed separate and apart from said spirits, then subjecting the same to a current of hot air in a nearly-closed vessel in a finely-divided state, and finally condensing the vapor by passing the same through condensers, substantially as described.

In testimony whereof I affix my signature in presence of two witnesses.

DONALD D. CATTANACH.

Witnesses:
CHARLES S. HYER,
RUSSELL H. SCOTT.